United States Patent [19]
Radovsky

[11] Patent Number: 5,952,759
[45] Date of Patent: Sep. 14, 1999

[54] BRUSHLESS SYNCHRONOUS ROTARY ELECTRICAL MACHINE

[75] Inventor: Alexander Radovsky, Haifa, Israel

[73] Assignee: S.H.R. Limited BVI

[21] Appl. No.: 08/947,862

[22] Filed: Oct. 9, 1997

Related U.S. Application Data

[63] Continuation-in-part of application No. 08/823,671, Mar. 24, 1997, Pat. No. 5,798,594.

[30] Foreign Application Priority Data

Aug. 5, 1996 [IL] Israel ......................................... 119010

[51] Int. Cl.$^6$ ..................................................... H02K 1/00
[52] U.S. Cl. ......................... 310/180; 310/49 R; 310/112; 310/165; 310/178; 310/261; 310/263
[58] Field of Search ................................... 310/49 R, 112, 310/156, 165, 178, 261, 263; 29/596, 597, 598

[56] References Cited

U.S. PATENT DOCUMENTS

| | | | |
|---|---|---|---|
| 3,992,641 | 11/1976 | Heinrich et al. | 310/168 |
| 4,127,802 | 11/1978 | Johnson | 318/696 |
| 4,385,247 | 5/1983 | Satomi | 310/49 R |
| 4,438,362 | 3/1984 | Brown | 310/152 |
| 4,496,868 | 1/1985 | Advolotkin et al. | 310/112 |
| 4,547,713 | 10/1985 | Langley et al. | 318/254 |
| 4,639,626 | 1/1987 | McGee | 310/155 |
| 5,030,867 | 7/1991 | Yamada et al. | 310/156 |
| 5,047,680 | 9/1991 | Torok | 310/156 |
| 5,117,144 | 5/1992 | Torok | 310/269 |
| 5,179,307 | 1/1993 | Porter | 310/68 B |
| 5,334,899 | 8/1994 | Skybyk | 310/268 |
| 5,345,131 | 9/1994 | Torok | 310/181 |

*Primary Examiner*—Elvin G. Enad
*Attorney, Agent, or Firm*—Mark M. Friedman

[57] ABSTRACT

A brushless synchronous rotary electrical machine comprises stationary stator and "inner" windings. Only the rotor moves. The inner windings are stationary helical windings, concentric with the rotor shaft and attached to the stator armature. Variation in time of the magnetic field associated with the rotor is provided by two magnetically interactive (ferromagnetic or ferrimagnetic) rotor projections that sweep past the sides of the inner windings as the shaft rotates, each projection including a certain number of lobes. The stator includes a magnetically active hub, within which the rotor rotates, from which project magnetically active stator cores. The stator windings are wound helically around the stator cores. Because all windings are stationary, brushes and rings are not needed. With three times as many stator cores as lobes in each projection, the machine functions as a three-phase generator. In an alternative embodiment, permanent magnets in the rotor projections are used instead of the inner windings to provide the magnetic field.

23 Claims, 8 Drawing Sheets

5,952,759

BRUSHLESS SYNCHRONOUS ROTARY ELECTRICAL MACHINE

This is a continuation-in-part of U.S. patent application Ser. No. 08/823,671, filed Mar. 24, 1997 now, U.S. Pat. No. 5,798,594.

FIELD AND BACKGROUND OF THE INVENTION

The present invention relates to electrical machinery and, more particularly, to brushless synchronous electrical generators and motors.

FIGS. 1A, 1B and 1C illustrate the terms used herein to define the geometries of rotary machines and their electrical windings. FIG. 1A shows a right circular cylinder 11, and the corresponding radial, azimuthal, and axial directions. As used herein, a "toroidal" winding is a winding, around a cylinder or torus, that is always perpendicular to the axial direction, and a "poloidal" winding is a winding that is at least partly parallel to the axial direction. FIG. 1B shows a torus 12 partially wound with a toroidal winding 13. FIG. 1C shows a torus 14 partially wound with a poloidal winding 15.

In a conventional synchronous AC electric generator, the rotor winding is connected to a DC current source via rings and brushes. As the rotor is rotated, the magnetic field created by the DC current rotates along with the rotor, inducing an AC electromagnetic force (EMF) in the stator winding. The same design is commonly used for synchronous electric motors: AC current in the stator winding creates a rotating magnetic field that interacts with the rotor's direct magnetic field, causing the rotor armature to rotate.

This design suffers from several inefficiencies. First, the rings and the brushes wear out over time and must be replaced. Second, parts of the stator winding, called "winding ends", protrude beyond the armature. These winding ends do not participate in the generation of electrical current in a generator, or in the generation of torque in a motor; but, unless the windings are made of superconductors, the winding ends contribute to resistance losses. In addition, the associated magnetic fields create eddy currents in electrical conductors outside of the armatures. These eddy currents are an additional drain on the power output of a generator or the power input of a motor.

The reason that rings and brushes are needed in the conventional synchronous machine design is to provide electrical power from a stationary DC current source to a moving rotor winding. There also are brushless designs, one of which, a synchronous induction machine, is illustrated schematically in cross-section in FIG. 2. An axially slotted cylinder 32, made of a ferromagnetic material such as iron, is rigidly mounted on a shaft 30, and rotates within a stationary armature 34. Armature 34 is geometrically in the form of an annulus, with a cylindrical central hole to accommodate slotted cylinder 32, and an interior equatorial slot to accommodate an annular, toroidally wound coil 36. In cross section, armature 34 looks like two opposed U's, as shown. What appear as the arms of the U's are actually two toroidal disks. A set 38 of windings are wound poloidally in slots on the inner periphery of these two disks. Conventionally there are three interleaved windings in set 38, making the synchronous induction machine of FIG. 2 a three-phase machine.

A DC current is supplied to toroidal coil 36, creating a magnetic field around slotted cylinder 32 and windings 38. Because cylinder 32 is slotted and ferromagnetic, as cylinder 32 rotates, the geometry of the magnetic field changes, inducing an AC EMF in poloidal windings 38. Conversely, an AC current introduced to poloidal windings 38 generates a time-varying magnetic field that applies a torque to cylinder 32, causing cylinder 32 to rotate.

The design of FIG. 2 eliminates the need for rings and brushes, but still has the inefficiencies associated with having winding ends that protrude outside the effective zone of electromagnetic induction. In addition, this design is inherently wasteful of space. Coils 36 and 38 must be separated spatially (as shown schematically in FIG. 2) to minimize eddy current losses.

There thus is a widely recognized need for, and it would be highly advantageous to have, an electrical machine (generator or motor) with only stationary windings, arranged geometrically for maximum efficiency.

SUMMARY OF THE INVENTION

According to the present invention there is provided an electrical machine including: (a) a stator armature having two lateral sides and including: (i) a magnetically interactive hub, and (ii) a number of magnetically interactive stator cores extending radially from the hub and positioned azimuthally around the hub at substantially equal angular separations; and (b) a rotor including: (i) a shaft extending axially through the hub and free to rotate therewithin, and (ii) a magnetically interactive rotor member, rigidly attached to the shaft, and including two projections extending radially outward from the shaft, each of the projections sweeping past at least a portion of one of the lateral sides of the stator armature as the shaft rotates.

As used herein, the term "magnetically interactive material" means a material that interacts strongly with a magnetic field, for example a ferromagnetic material or a ferrimagnetic material. Parts of the present invention that are made of, or include, a magnetically interactive material are herein called "magnetically interactive". The preferred magnetically interactive materials of the present invention are soft ferromagnetic materials such as magnetic steel, and magnetically interactive insulators, such as ferrite. If electrically conductive materials such as magnetic steel are used, the parts constructed thereof preferably are constructed so as to suppress energy-wasting eddy currents. For example, these parts may be laminated of alternating layers of magnetic steel and an insulator.

The present invention is similar to the synchronous induction machine of FIG. 2, but the windings and armatures are arranged so that all, or almost all, of the length of the windings actively participate in the energy transformation process. In one preferred embodiment of the present invention, one or more of the windings are wound around a shaft, with a gap between the shaft and the windings, so that those windings can remain stationary as the shaft rotates therewithin. Two projections, made of a magnetically interactive material, are fixed to the shaft next to the windings. The shaft and the projections fixed thereto constitute a rotor. As the rotor rotates, the projections are swept past all the windings. The radial extent of the projections vary azimuthally, so that the geometry of a magnetic field around the shaft changes as the shaft rotates, or conversely, a time-varying magnetic field near the shaft exerts a torque on the projections. Because of the radially inward position of the windings nearest the shaft, they are referred to herein as the "inner" windings.

The inner winding, and one or more "stator" windings, are rigidly attached to a stator armature that surrounds the rotor.

The stator armature includes a magnetically interactive annular cylindrical hub and several magnetically interactive cores that project radially outwardly from the hub. The inner windings are axially adjacent to, concentric with, and rigidly attached to the hub. Each stator winding is wound helically around one of the cores.

Thus, the present invention succeeds in providing a compact, efficient brushless electrical machine whose windings are fully exploited. The principle of the present invention actually was partially disclosed over 100 years ago, by Mordey, in U.S. Pat. No. 437,501. Mordey's electrical generator includes an optionally stationary toroidal inner winding, within which rotates a rotor that includes two projections that sweep past the inner winding, and a toroidal stator winding surrounding and concentric with the inner winding. This idea was not pursued in practice, and was superseded by the generator designs described above, presumably because Mordey's design is a one-phase design, in which, when used as a generator, energy-wasting secondary AC currents are induced in the excitation winding.

The problems addressed herein also have been addressed by Török in U.S. Pat. No. 5,047,680. Török's solution, however, requires the use of permanent magnets, and therefore is inherently limited to low power applications. In addition, Török's permanent magnets are mounted on his stator as circumferential rings that are mutually staggered, whereas his toothed rotor rings, which rotate within the rings of permanent magnets, are mutually aligned, so that when one rotor ring is aligned with the surrounding ring of permanent magnets, thereby being in a position of low reluctance, the other rotor rings are staggered with respect to the rings of permanent magnets that surround them, and are therefore in positions of high reluctance. This reduces the efficiency of Török's design.

Although inner windings are the preferred mechanism for producing a magnetic field, the scope of the present invention also includes the use of permanent magnets for this purpose. Permanent magnets may be preferred over inner windings for this purpose in low-power applications.

A further advantage of the electrical machine of the present invention over the machine of the prior art is that the stator windings of the present invention require less insulation than the stator windings of the prior art. In a conventional synchronous AC generator, for example, the stator winding is inserted into slots in the stator armature, and must be insulated on all sides from the voltage difference (whatever the output of the generator is) between the winding and the armature. Stator windings of the present invention are wound helically, on the surfaces of the stator armatures, and so must be insulated from the output voltage difference of the generator only on the sides that face the stator armatures. The insulation between lengths of stator winding needs to withstand a much smaller voltage difference, and so may be much thinner than the insulation between the windings and the armature.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a brushless synchronous rotary electrical machine in which the armature and winding geometries are selected to maximize the interaction of the magnetic fields created by the windings. The present invention can be used to generate AC power, or to convert AC power to rotary motion, more efficiently than presently known electrical machines.

Figure 1A:
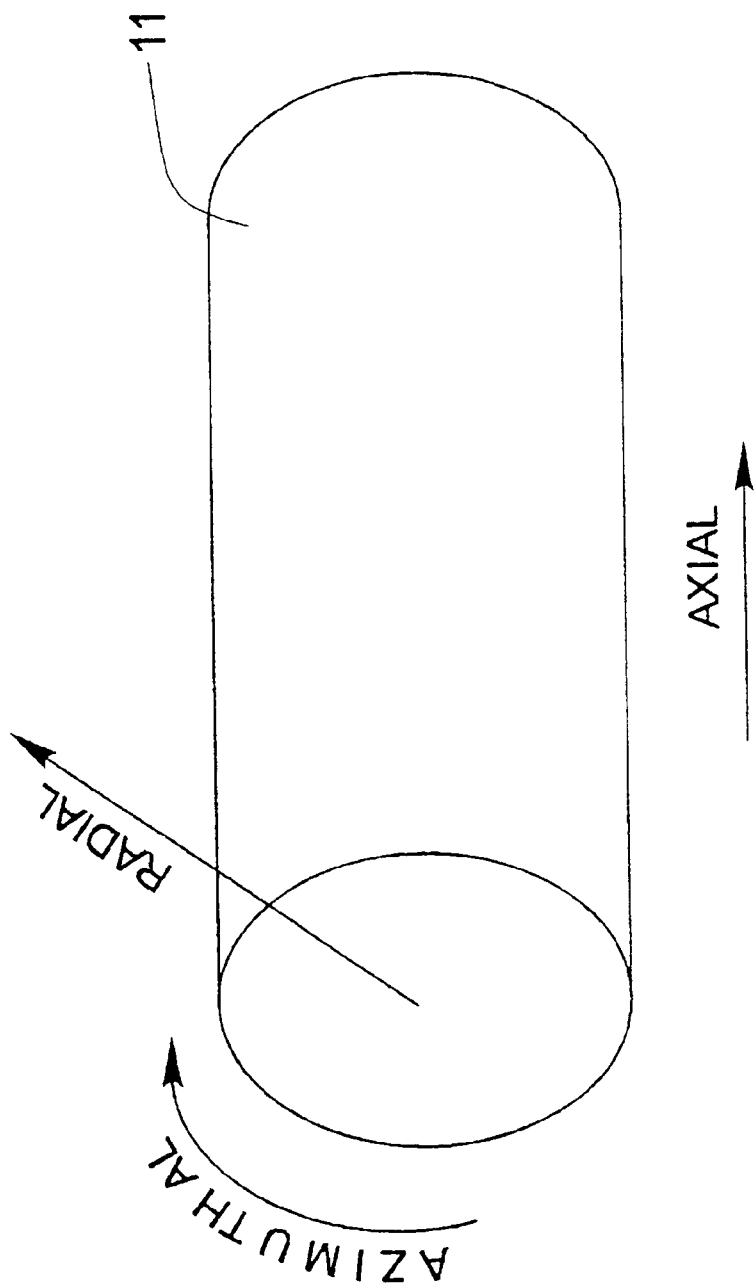
FIG. 1A (prior art) illustrates the definition of geometric terms used herein.
Figure 1B:
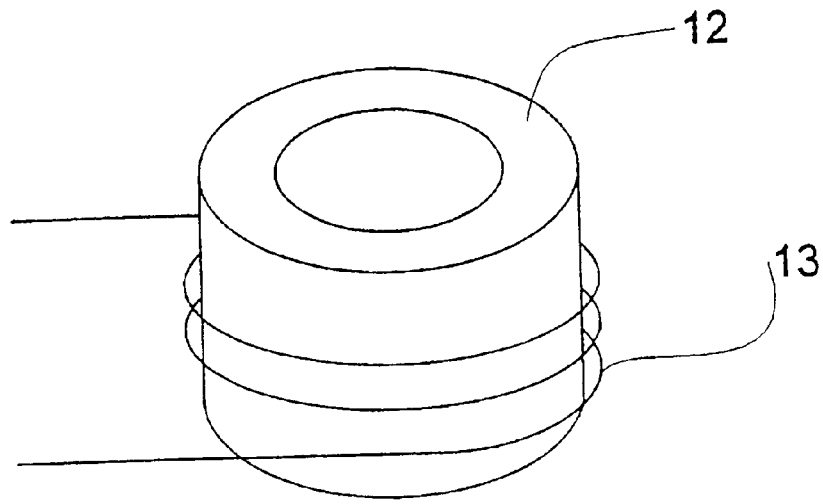
FIG. 1B (prior art) illustrates the definition of the term "toroidal" as used herein.
Figure 1C:
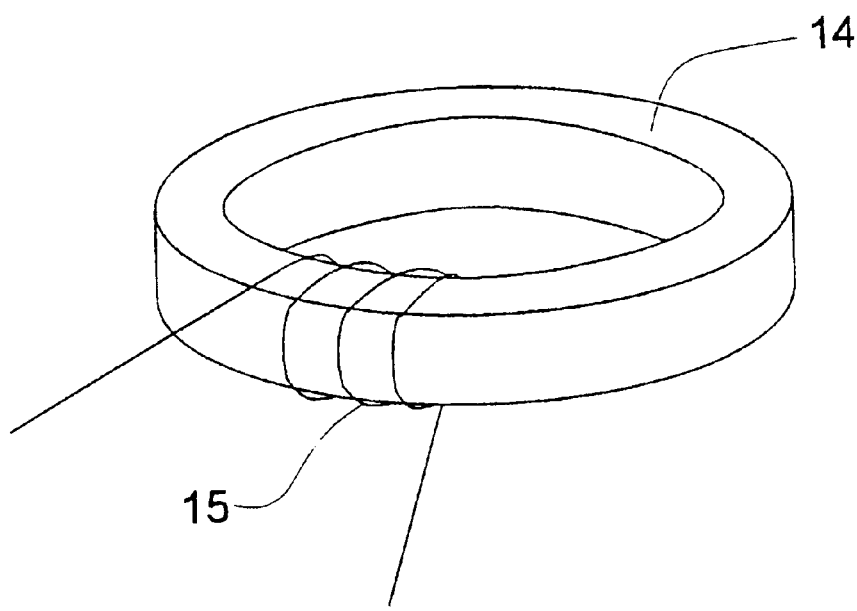
FIG. 1C (prior art) illustrates the definition of the term "poloidal" as used herein.
Figure 2:
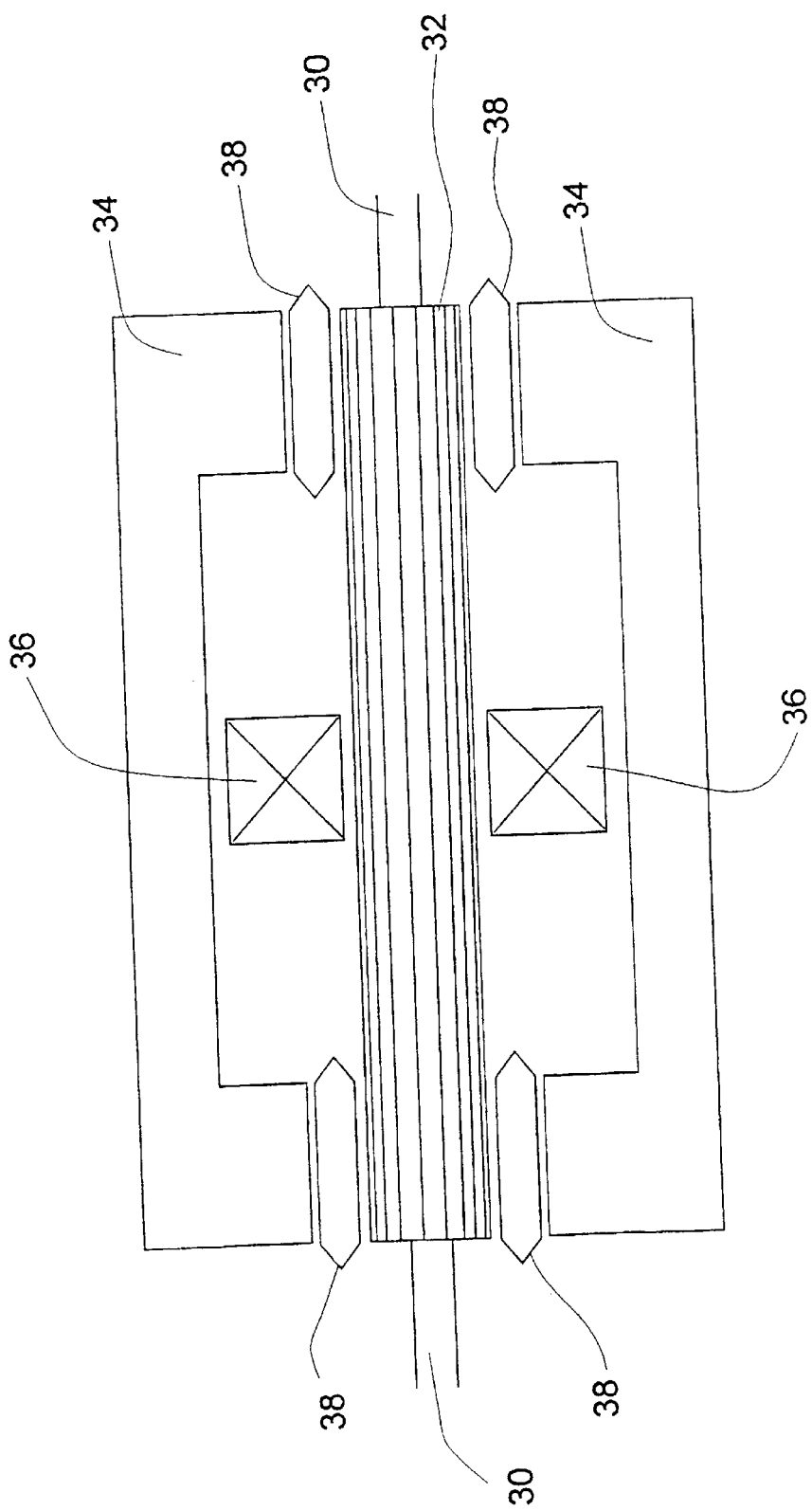
FIG. 2 (prior art) is a schematic cross-section of a synchronous induction machine.
Figure 3:
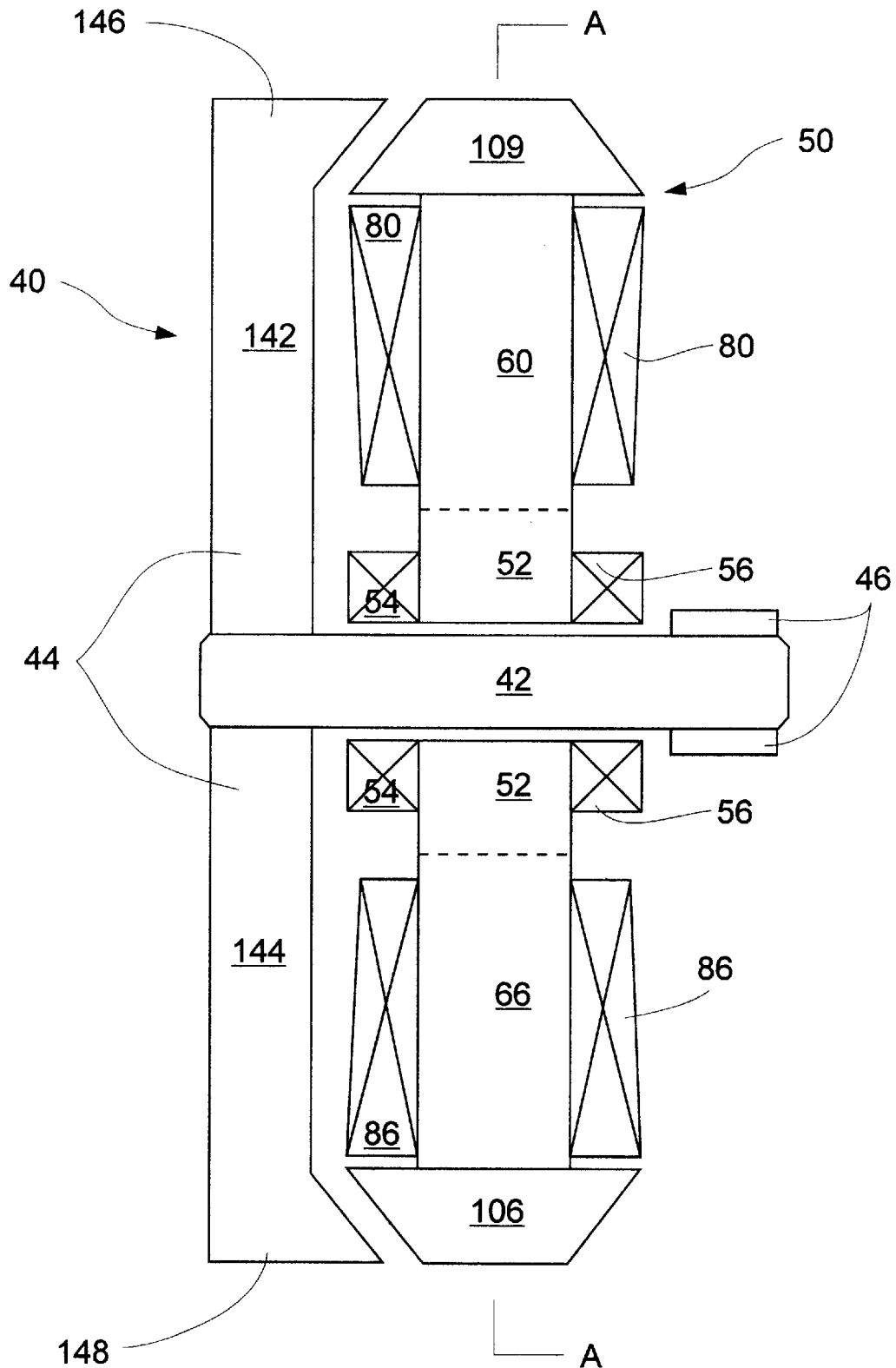
FIG. 3 is an axial cross section of a first embodiment of the present invention.
Figure 4:
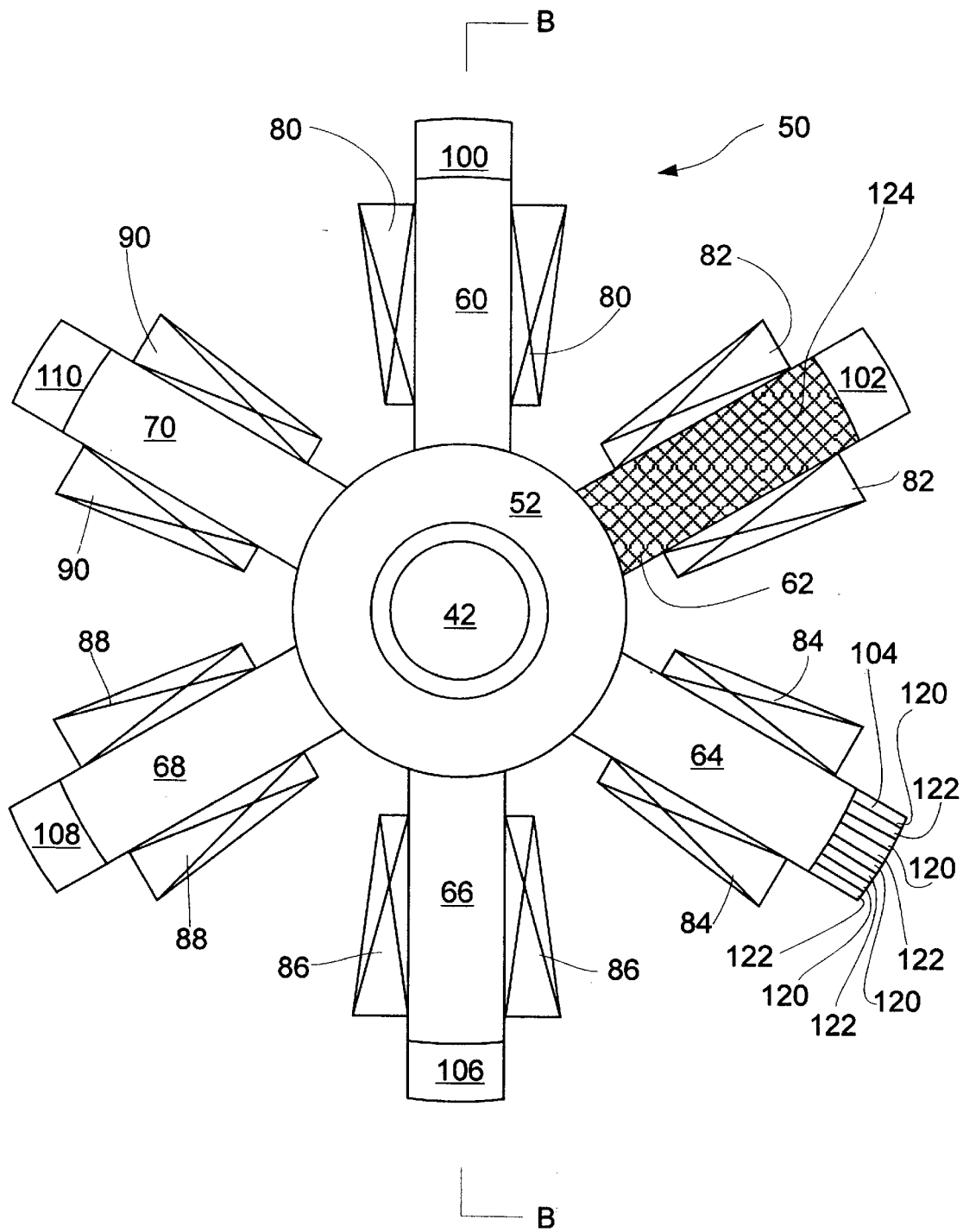
FIG. 4 is a transverse cross section of the embodiment of FIG. 3.
Figure 5:
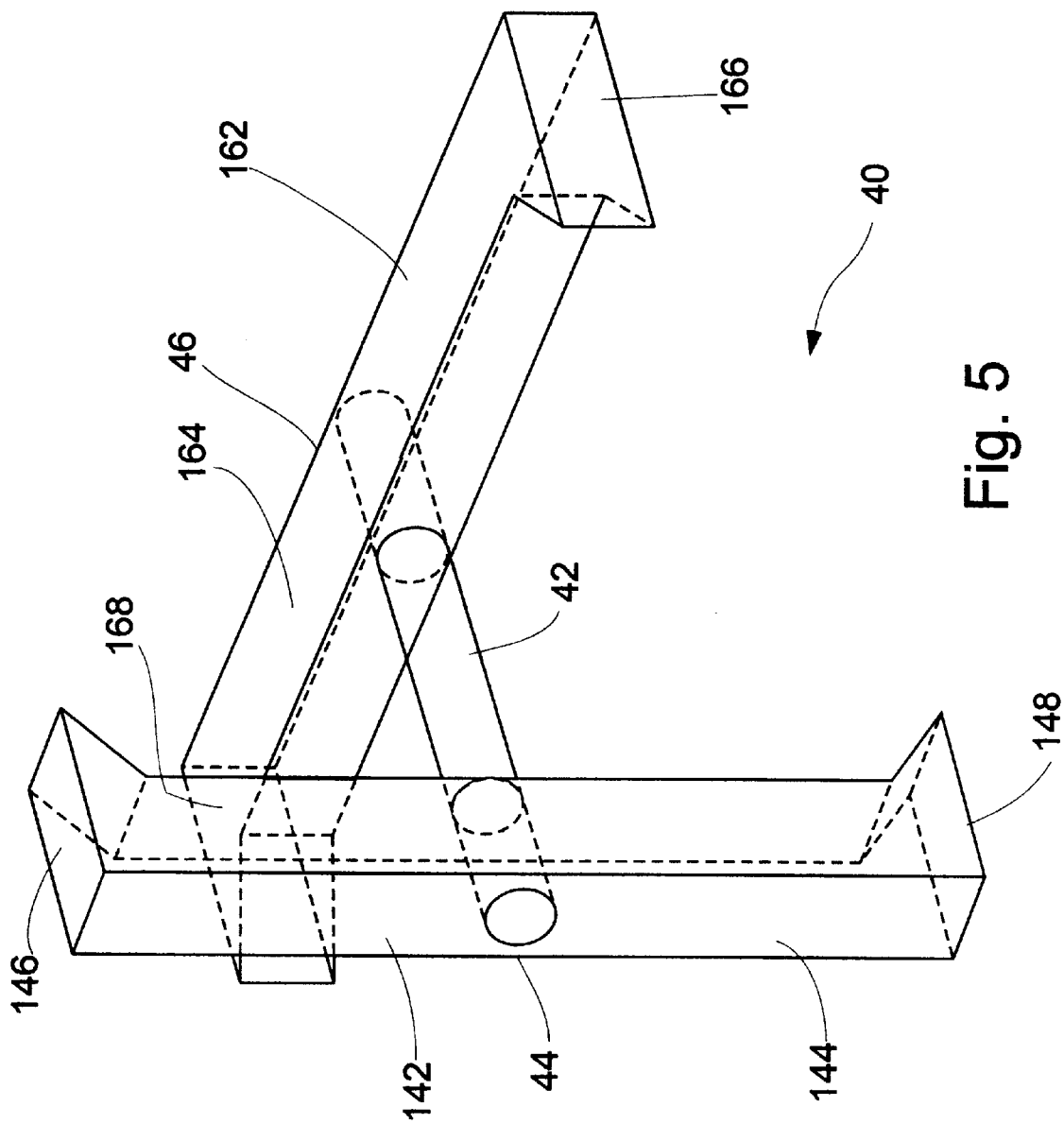
FIG. 5 is a perspective view of the rotor of the embodiment of FIG. 3.

Referring now to the drawings, FIG. 3 is an axial cross-sectional view of a first embodiment of the present invention; FIG. 4 is a transverse cross-sectional view of the first embodiment of the present invention; and FIG. 5 is a perspective view of the rotor of the first embodiment of the present invention. The cross-section of FIG. 4 is along line A—A of FIG. 3. The cross-section of FIG. 3 is along line B—B of FIG. 4. Hidden edges in FIG. 5 are indicated by dashed lines.

The two parts of the present invention are a rotor 40 and a stator that is based on a stator armature 50. Stator armature 50 is made of a magnetically interactive material, and includes an annular cylindrical hub 52 from which project radially outward, at equal azimuthal angular spacings, 6 magnetically interactive cores 60, 62, 64, 66, 68 and 70. Wound helically around core 60 is a stator winding 80. Wound helically around core 62 is a stator winding 82. Wound helically around core 64 is a stator winding 84. Wound helically around core 66 is a stator winding 86. Wound helically around core 68 is a stator winding 88. Wound helically around core 70 is a stator winding 90. The cores are capped, on the radially outward ends thereof by axially directed trapezoidal crosspieces: a crosspiece 100 on core 60, a crosspiece 102 on core 62, a crosspiece 104 on core 64, a crosspiece 106 on core 66, a crosspiece 108 on core 68, and a crosspiece 110 on core 70. Rigidly attached to either lateral side of, and concentric with, hub 52 are two toroidal inner windings 54 and 56.

Within hub 52 rotates a magnetically interactive shaft 42 which constitutes the central portion of rotor 40. Rigidly attached to shaft 42 is the peripheral portion of rotor 40: two mutually perpendicular projections 44 and 46, one at either end of shaft 42 and both perpendicular to shaft 42. Projection 44 includes two lobes 142 and 144 directed in mutually opposite radial directions from shaft 42. Similarly, projection 46 includes two lobes 162 and 164 directed in mutually opposite radial directions from shaft 42. As rotor 40 rotates, projection 44 sweeps past inner winding 54, projection 46 sweeps past inner winding 56, and both projections 44 and 46 sweep past stator windings 80, 82, 84, 86, 88 and 90. Each lobe 142, 144, 162 and 164 is capped, on its radially outward end, by an angled head 146, 148, 166 and 168 respectively. Heads 146, 148, 166 and 168 are shaped in a complementary manner to trapezoidal crosspieces 100, 102, 104, 106, 108 and 110, to sweep past the axial ends thereof, as shown in FIG. 3 for head 146 with respect to crosspiece 100 and head 148 with respect to crosspiece 106. In embodiments of the present invention intended for use as generators, heads 146, 148, 166 and 168, and crosspieces 100, 102, 104, 106, 108 and 110, are further shaped with respect to the air gaps therebetween, so that the alternating current produced varies sinusoidally in time.

It should be noted that the trapezoidal shape of crosspieces 100, 102, 104, 106, 108 and 100, and the complementary shape of heads 146, 148, 166 and 168, are illustrative. The scope of the invention includes all suitable shapes, including, for example, rectangular, which, although less energy-efficient than the illustrated shapes, is easier to fabricate.

As shown more particularly for crosspiece 104 and core 62 in FIG. 4, crosspieces 100, 102, 104, 106, 108 and 110, cores 60, 62, 64, 66, 68 and 70, and projections 44 and 46 are constructed to suppress power-wasting eddy currents. Two suitable methods of construction are illustrated. Crosspiece 104 is shown as a laminated structure made of parallel sheets 120 of a magnetically interactive metal, such as magnetic steel, separated by layers 122 of an insulator, such as epoxy glue. Core 62 is shown made of sintered ferrite particles, represented by cross-hatching 124. Ferrite, being an insulator, does not support eddy currents. Alternatively, coated powder technology may be used to suppress eddy currents.

Not shown in FIGS. 3–6 are the housing in which stator armature 50 is mounted and the bearings, also mounted on the housing, that support shaft 42 as shaft 42 rotates within hub 52.

Figure 6:
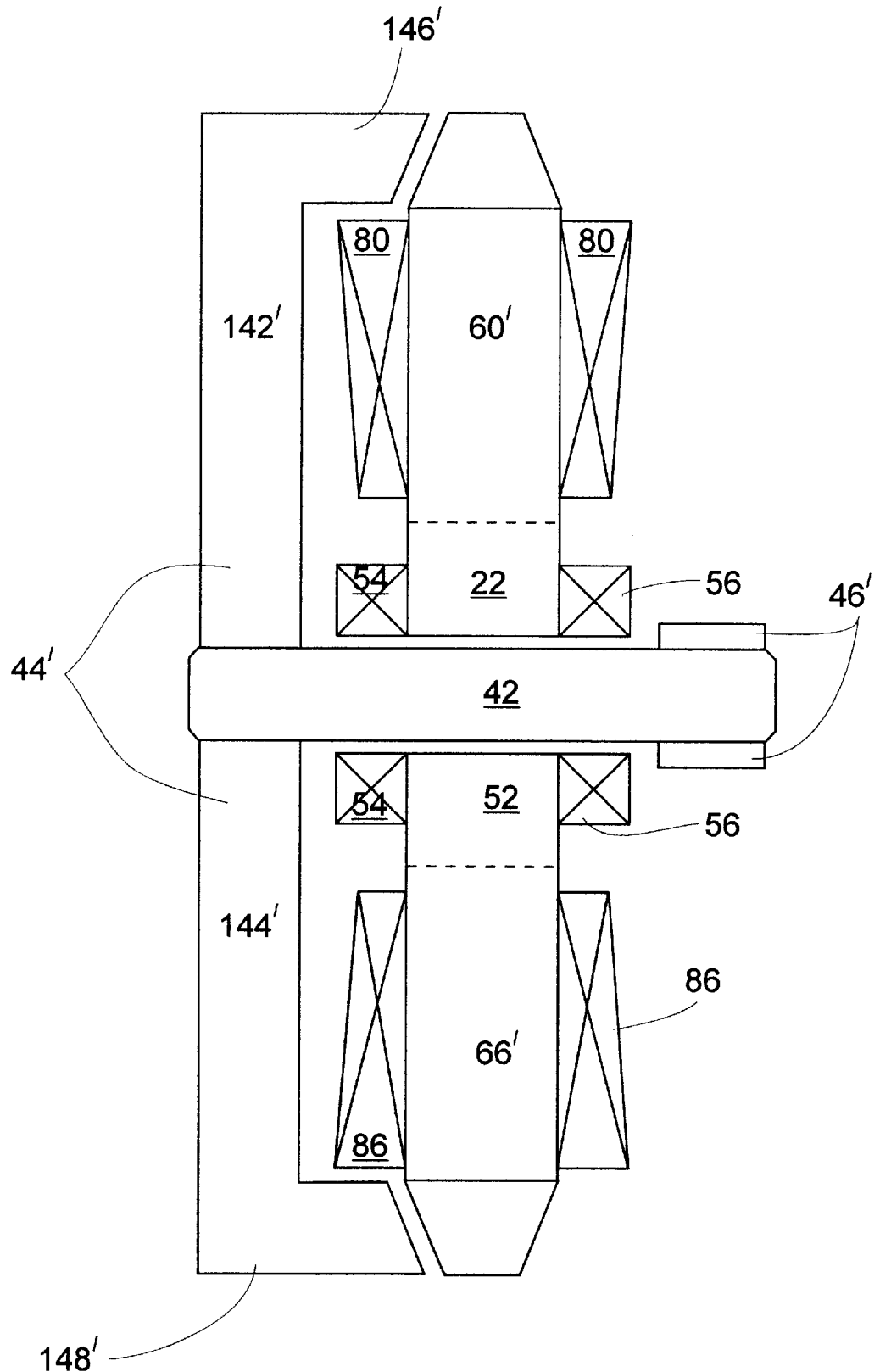
FIG. 6 is an axial cross section of a variant of the embodiment of FIG. 3.

FIG. 6 is an axial cross-section of a modified design of the first embodiment of the present invention, suitable for stator cores made of a magnetically active insulator such as ferrite. The embodiment of FIG. 6 lacks crosspieces. Instead, stator cores 60' and 66', as well as the other four stator cores, are extended radially outward, and shaped so that heads 146' and 148' of lobes 142' and 144' of modified projection 44', and the corresponding heads of the lobes of similarly modified projection 46', sweep past the radial extensions of the stator cores, as shown. The stator cores of this embodiment may be rectangular, circular or oval in cross section.

To use the first embodiment of the present invention as a three-phase generator, DC current is supplied to inner windings 54 and 56 and rotor 40 is rotated. The magnetically interactive stator cores divert the magnetic field created by the DC current through the stator windings. As the magnetically interactive projections sweep past the stator windings, the direction in which the magnetic field is directed through the stator cores changes periodically, inducing AC EMFs in the stator windings.

Suppose for definiteness that the DC current in inner windings 54 and 56 flows into the plane of FIG. 3 above shaft 42 and out of the plane of FIG. 3 below shaft 42, i.e., counterclockwise in FIG. 4. The magnetic flux through inner windings 54 and 56 is always directed to the left in FIG. 3. With rotor 40 oriented relative to the stator cores as shown in FIG. 3, magnetic flux branches up into lobe 142 and down into lobe 144. The upper branch of the magnetic flux crosses from head 146 to crosspiece 100 across the air gap therebetween and descends through stator core 60 to hub 52. The lower branch of the magnetic flux crosses from head 148 to crosspiece 106 across the air gap therebetween and ascends through stator core 66 to hub 52. In hub 52, the magnetic flux splits into four branches, radially outward through stator cores 62, 64, 68 and 70. The two branches through stator cores 62 and 64 cross from crosspieces 102 and 104 to head 166 across the air gaps therebetween, to merge in head 166 and proceed radially inward via lobe 162. The two branches through stator cores 68 and 70 cross from crosspieces 108 and 110 to head 168 across the air gaps therebetween, to merge in head 168 and proceed radially inward via lobe 164. The inwardly directed magnetic fluxes in lobes 162 and 164 merge into shaft 42. As a result, the magnetic flux through stator windings 80 and 86 is directed radially inward at its maximum value, and the magnetic flux through stator windings 82, 84, 88 and 90 is directed radially outward at half its maximum value.

Now rotate rotor 40 clockwise by 30° with respect to FIG. 4. Pole 142 now is halfway between stator cores 60 and 62, pole 144 is halfway between stator cores 66 and 68, pole 162 is adjacent to stator core 64, and pole 164 is adjacent to stator core 70. Therefore, the magnetic flux through stator windings 80, 82, 86 and 88 is directed radially inward, at half its maximum value, and the magnetic flux through stator windings 84 and 90 is directed radially outward at its maximum value. Rotating rotor 40 clockwise by another 30° brings pole 142 adjacent to stator core 62, pole 144 adjacent to stator core 68, pole 162 halfway between stator cores 64 and 66, and pole 164 halfway between stator cores 70 and 60. Now, the magnetic flux through stator windings 82 and 88 is directed radially inward at its maximum value, and the magnetic flux through stator windings 80, 84, 86 and 90 is directed radially outward at half its maximum value. Thus, as rotor 40 is rotated at a uniform angular speed, AC EMFs are induced in stator windings 80, 82, 84, 86, 88 and 90 that are identical except for being shifted in phase relative to each other by one-third of a cycle.

The specific embodiment of the present invention that is illustrated in FIG. 3–6 is a four-lobe, six-pole machine. In general, the rotor projections of the present invention may have any number of magnetically active lobes, with the lobes of each projection spaced azimuthally at equal angular increments and with the lobes of one projection interleaved azimuthally with respect to the lobes of the other projection. Correspondingly, in the embodiments of the present invention that are configured as three-phase machines, the stator armature includes three times as many stator cores as there are lobes in either of the projections, i.e., one and one-half times the total number of rotor lobes. In other embodiments within the scope of the present invention, configured as one-phase machines, the stator armature includes as many stator cores as there are lobes in either of the projections.

In the case of rotor projections that have odd numbers of lobes, the angular interleaving means that the lobes of one projection extend radially away from the shaft in a manner opposite to the lobes of the other projection.

Figure 7:
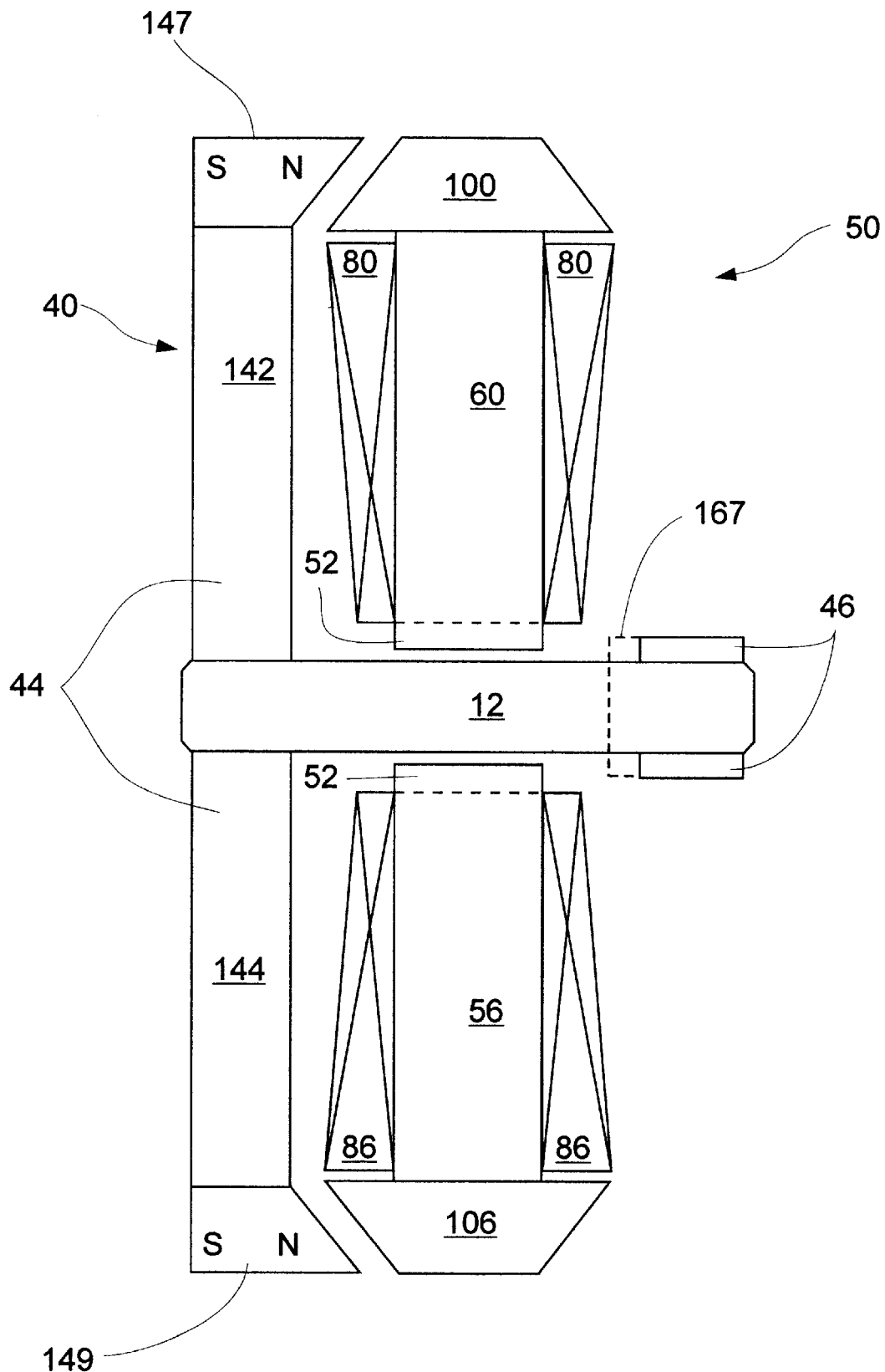
FIG. 7 is an axial cross section of a second embodiment of the present invention.

FIG. 7 is an axial cross-sectional view of a second embodiment of the present invention. In this embodiment, DC excitation windings 54 and 56 are absent. Instead, heads 146, 148, 166 and 168 are replaced by permanent magnets, of which two, 147 and 149, are shown cross-sectionally in FIG. 7. Permanent magnet 167, which replaces head 166 at the end of lobe 162, is represented schematically in FIG. 7 by a dashed line. Note that the permanent magnets mounted on projection 46 are polarized opposite to the permanent magnets mounted on projection 44, so that if the poles of permanent magnet 167 were to be drawn in FIG. 7, "S" would be to the left and N would be to the right. In other words, the north poles of the permanent magnets of projection 44 and the south poles of the permanent magnets of projection 46 point towards the stator cores; whereas the south poles of the permanent magnets of projection 44 and the north poles of the permanent mgnets of projection 46 point away from the stator cores. In the position of rotor 40 relative to stator 50 shown in FIG. 7, the permanent magnets cooperate to produce magnetic flux that is directed as described above for FIG. 3: up into lobe 142, down into lobe 144, radially inward through stator cores 60 and 66, radially outward through stator cores 62, 64, 68 and 70, and radially inward through lobes 162 and 164.

It will be appreciated that this second embodiment of the present invention may be modified, analogously to the modification of the first embodiment of the present invention shown in FIG. 6, to have insulating stator cores without crosspieces.

While the invention has been described with respect to a limited number of embodiments, it will be appreciated that many variations, modifications and other applications of the invention may be made.

What is claimed is:

1. An electrical machine comprising:
   (a) a stator armature having two lateral sides and including:
      (i) a magnetically interactive hub,
      (ii) a number of magnetically interactive stator cores extending radially from said hub and positioned azimuthally around said hub at substantially equal angular separations, and
      (iii) at least one magnetically interactive crossbar, radially beyond and rigidly attached to one of said stator cores; and
   (b) a rotor including:
      (i) a shaft extending axially through said hub and free to rotate therewithin, and
      (ii) a magnetically interactive rotor member, rigidly attached to said shaft, and including two projections extending radially outward from said shaft, each of said projections sweeping past at least a portion of one of said lateral sides of said stator armature and past said at least one crossbar as said shaft rotates.

2. The electrical machine of claim 1, further comprising:
   (c) at least one substantially toroidal annular inner winding, rigidly attached to said stator armature and concentric with said hub.

3. The electrical machine of claim 2, wherein there are at least two of said inner windings, a first of said inner windings being axially adjacent to a first lateral side of said stator armature and a second of said inner windings being axially adjacent to a second lateral side of said stator armature.

4. The electrical machine of claim 1, further comprising:
   (d) stator windings, equal in number to said stator cores, each of said stator windings being wound toroidally around one of said stator cores.

5. The electrical machine of claim 1, wherein said projections have azimuthally varying shapes, such that a first of said projections and a second of said projections extend radially outward from said shaft in a substantially opposite manner.

6. The electrical machine of claim 5, wherein each of said first projection and said second projection includes at least one lobe, said first projection and said second projection having a like number of lobes, said lobes of said second projection being interleaved angularly with said lobes of said first projection.

7. The electrical machine of claim 6, wherein said number of lobes of each of said projections is equal to one-third of said number of stator cores.

8. The electrical machine of claim 1, wherein a first of said projections includes a certain number of lobes and a second of said projections includes a like number of said lobes, said lobes of said second projection being interleaved angularly with said lobes of said first projection.

9. The electrical machine of claim 8, wherein said number of lobes of each of said projections is equal to one-third of said number of stator cores.

10. The electrical machine of claim 1, wherein said at least one crossbar is constructed so as to suppress eddy currents.

11. The electrical machine of claim 10, wherein said construction includes a plurality of substantially parallel sheets of a magnetically interactive material separated by at least one insulator.

12. The electrical machine of claim 10, wherein said construction includes a magnetically interactive insulator.

13. The electrical machine of claim 12, wherein said magnetically interactive insulator includes ferrite.

14. The electrical machine of claim 1, wherein said stator cores are constructed so as to suppress eddy currents.

15. The electrical machine of claim 14, wherein said construction includes a plurality of substantially parallel sheets of a magnetically interactive material separated by at least one insulator.

16. The electrical machine of claim 14, wherein said construction includes a magnetically interactive insulator.

17. The electrical machine of claim 16, wherein said magnetically interactive insulator includes ferrite.

18. The electrical machine of claim 1, wherein said projections are constructed so as to suppress eddy currents.

19. The electrical machine of claim 18, wherein said construction includes a plurality of substantially parallel sheets of a magnetically interactive material separated by at least one insulator.

20. The electrical machine of claim 18, wherein said construction includes a magnetically interactive insulator.

21. The electrical machine of claim 20, wherein said magnetically interactive insulator includes ferrite.

22. The electrical machine of claim 1, wherein each of said projections includes at least one permanent magnet.

23. The electrical machine of claim 22, wherein said at least one permanent magnet of a first of said two projections and said at least one permanent magnet of a second of said two projections cooperate to produce a magnetic field directed substantially radially through said stator cores.

* * * * *